United States Patent
Goddeti et al.

(10) Patent No.: US 10,616,929 B2
(45) Date of Patent: Apr. 7, 2020

(54) METHOD AND APPARATUS FOR INTERNET RESOURCE SHARING

(71) Applicant: QUALCOMM Incorporated, San Diego, CA (US)

(72) Inventors: Penchal Prasad Goddeti, Sulzbach (DE); Muhammad Umair Qureshi, Frankfurt am Main (DE); Abhijeet Shrikrishna Gune, Frankfurt am Main (DE); Deepesh Garg, Schwalbach am Taunus (DE); Deepak Shastry Ravishankar, Frankfurt (DE); Azeem Waqar, Frankfurt (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/944,721

(22) Filed: Apr. 3, 2018

(65) Prior Publication Data
US 2019/0306898 A1    Oct. 3, 2019

(51) Int. Cl.
| | | |
|---|---|---|
| *H04W 76/10* | (2018.01) | |
| *H04W 84/04* | (2009.01) | |
| *H04W 88/16* | (2009.01) | |
| *H04W 88/02* | (2009.01) | |

(52) U.S. Cl.
CPC .......... *H04W 76/10* (2018.02); *H04W 84/042* (2013.01); *H04W 88/02* (2013.01); *H04W 88/16* (2013.01)

(58) Field of Classification Search
CPC .................................................. H04W 76/10
See application file for complete search history.

(56) References Cited

U.S. PATENT DOCUMENTS

| | | | |
|---|---|---|---|
| 6,845,389 B1 * | 1/2005 | Sen ......................... | A63F 13/12 |
| | | | 709/204 |
| 9,374,697 B2 | 6/2016 | Shih et al. | |
| 9,775,022 B1 | 9/2017 | Sahu et al. | |
| 2017/0118255 A1 * | 4/2017 | Tsai ....................... | H04W 8/183 |
| 2017/0142613 A1 * | 5/2017 | Singh .................... | H04W 28/08 |

FOREIGN PATENT DOCUMENTS

| | | |
|---|---|---|
| CN | 105472785 A | 4/2016 |
| IN | 201641026243 A | 2/2018 |
| WO | 2017136959 A1 | 8/2017 |

* cited by examiner

*Primary Examiner* — Samina F Choudhry
(74) *Attorney, Agent, or Firm* — Ke Liu (57) ABSTRACT

Systems, apparatuses, and methods for Internet resource sharing between multiple subscribers, for example, a first subscriber and a second subscriber, each of which may be in active communications with a cellular network or in a standby mode. It may be determined whether to use an internet connectivity provided by the first subscriber for an IP Multimedia Subsystem (IMS) service on the second subscriber. The second subscriber may conduct the IMS service via internal hotspot provided by the first subscriber or via the second subscriber's own cellular network, or switch between the two. A packet data network connection may be established to transport IMS data and signaling between the second subscriber and a gateway of the second network through the first network.

28 Claims, 8 Drawing Sheets

METHOD AND APPARATUS FOR INTERNET RESOURCE SHARING

BACKGROUND

This disclosure relates generally to wireless communications, and more specifically, to internet resource sharing between multiple subscribers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long-Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A UE may be equipped with multiple Subscriber Identity Modules (SIMs), for example, in a dual-SIM device. Each SIM may provide a separate subscriber with separate identity (e.g., phone number). Generally speaking, a subscriber may refer to a specific user who subscribes to a cellular service with a network or operator, whereby the network or operator may provide communication services for the user. Each subscriber may subscribe to a separate cellular service, network, or operator. Some of the subscribers may actively communicate on the respective cellular service, while the other subscribers may stay in standby. Depending on the underlying cellular service, a subscriber may provide internet connectivity (or generally termed as "internet resource") to an application or its user. As used herein, "internet" may refer to any packet data network (PDN), for example, the commonly known "INTERNET" which is the global system of interconnected computer networks that use the Internet protocol suite (e.g., Transmission Control Protocol (TCP)/Internet Protocol (IP)) to link devices worldwide.

A subscriber may access its associated cellular network for an IP Multimedia Subsystem (IMS) service. The IMS may provide an end-user with a rich multimedia communications experience. It can support voice, video, and other multimedia applications across various types of networks (including traditional telephony systems, wireless or cellular networks, or the Internet).

SUMMARY

Systems, apparatuses, and methods are provided for internet resource sharing between multiple subscribers, e.g., a first subscriber (SUB1) and a second subscriber (SUB2). The second subscriber may conduct IMS services via internal hotspot provided by the first subscriber or via the second subscriber's own cellular network. The second subscriber may maintain availability and continuity of IMS services even though the second subscriber may lose radio coverage on its own cellular network.

In an aspect, a method of wireless communication is provided. The method may include determining whether to use an IP connectivity of SUB1 for an IMS service on SUB2. If the IP connectivity of SUB1 is to be used, the method may also include obtaining a PDN connection based on the IP connectivity of SUB1, through a first network associated with SUB1 and to a gateway of a second network associated with SUB2. The method may include conducting the IMS service (e.g., an IMS call) on SUB2 over the PDN connection.

In another aspect, a UE is provided that may include a transceiver and a processor coupled thereto. The processor may be configured to determine whether to use an IP connectivity of SUB1 for an IMS service on SUB2. If the IP connectivity of SUB1 is to be used, the processor may be configured to obtain a PDN connection based on the IP connectivity of SUB1, through a first network associated with SUB1 and to a gateway of a second network associated with SUB2. The processor may be configured to conduct the IMS service on SUB2 over the PDN connection via the transceiver.

In another aspect, an apparatus of wireless communication is provided. The apparatus may include means for determining whether to use an IP connectivity of SUB1 for an IMS service on SUB2. The apparatus may also include means obtaining a PDN connection based on the IP connectivity of SUB1, through a first network associated with SUB1 and to a gateway of a second network associated with SUB2, if SUB1 is to be used. The apparatus may include means for conducting the IMS service on SUB2 over the PDN connection.

In another aspect, a non-transitory computer-readable medium is provided that has instructions stored thereon. The instructions may include codes executable for an apparatus to determine whether to use an IP connectivity of SUB1 for an IMS service on SUB2. The medium may also include codes for obtaining a PDN connection based on the IP connectivity of SUB1, through a first network associated with SUB1 and to a gateway of a second network associated with SUB2, if the IP connectivity of SUB1 is to be used. The medium may include codes for conducting the IMS service on SUB2 over the PDN connection.

In addition, the PDN connection (through SUB1) may be handed-over to SUB2 and the IMS service may be conducted over a cellular service of SUB2 by the second network.

In various aspects, the IP connectivity of SUB1 may be used only if SUB2 has no access to a wireless local area network. Furthermore, the IP connectivity of SUB1 may be used only if a radio frequency condition of a current cellular service of SUB2 is below a threshold, or only if SUB2 is in a limited service due to roaming that does not support the IMS service.

In various aspects, SUB2 may obtain the PDN connection by sending a request to SUB1 for the PDN connection and receiving from SUB1 an acknowledgement of the request.

In various aspects, the PDN connection may include a PDN gateway of the first network in communications with the gateway of the second network.

In various aspects, a tunneling protocol may be applied on IP packets of the IMS service over the PDN connection, for example, when the gateway of the second network is an evolved packet data gateway.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

A dual (or multi) SIM user device may allow an end-user to use IMS applications (e.g., making or receiving voice over IP calls) on two (or more) subscribers with separate identities. The different subscribers may access different cellular services or networks, which may belong to different operators. In many cases, a subscriber may not access the cellular radio network of another subscriber, and a subscriber may conduct IMS service only on its own cellular network, e.g., communicating with a base station of the subscriber's own cellular service.

In some scenarios, a subscriber's own cellular service may be in outage; for example, due to poor radio conditions, an IMS service on the subscriber may become unavailable via the subscriber's radio access network. But the cellular service on another subscriber may be in good condition. Even though the subscriber in outage may not directly access a radio network (e.g., via a base station) of the other subscriber, the other subscriber may provide an internet connection to the end-user and its applications. Thus, techniques may be desired for using internet resource of one subscriber to support IMS services on another subscriber.

Aspects of the disclosure introduced above are described below in the context of a wireless communications system. Examples of internet resource sharing are then described. Aspects of the disclosure are further illustrated by and described with reference to various apparatus diagrams, system diagrams, and flowcharts.

Figure 1:
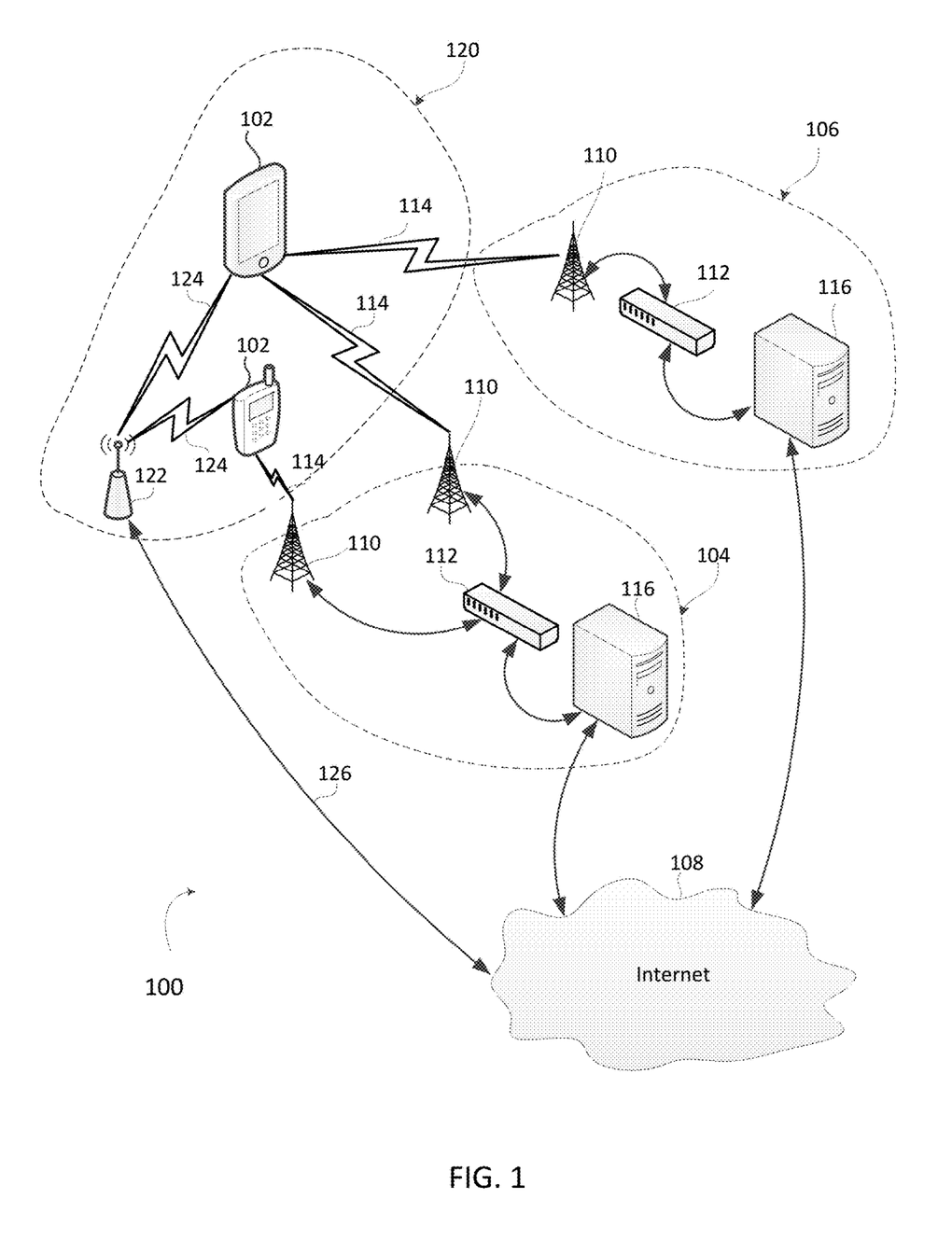
FIG. 1 illustrates an example of a wireless communications system that supports user equipment with dual Subscriber Identity Modules in accordance with the present disclosure.

FIG. 1 illustrates an example of wireless communications system 100 that supports user equipment with dual Subscriber Identity Modules in accordance with the present disclosure. The wireless communication system 100 may include one or more Wireless Wide Area Networks (WWANs), e.g., WWAN 104 and WWAN 106, and/or one or more wireless local area networks (WLANs), e.g., WLAN 120. Examples of the WWANs include Global System for Mobile Communications (GSM), Wideband Code Division Multiple Access (W-CDMA), Long Term Evolution, New Radio, and so on. Examples of the WLANs include various wireless access technologies based on the Institute of Electrical and Electronics Engineers (IEEE) 802.11x standards, or commonly known as Wireless-Fidelity (Wi-Fi or WiFi).

A user equipment 102 may connect to one or more of these networks, which may be deployed by different (or same) operators. UEs 102 may be dispersed throughout the wireless communications system 100, and each UE 102 may be stationary or mobile. A user equipment may also be referred to as a subscriber station, an access terminal, a remote terminal, a handset, a user device, or generally a wireless communication device or some other suitable terminology in the context.

The WWANs 104 and 106 may include various base stations 110, which may communicate with various UEs 102 via communication links 114. A communication link 114 may include downlink transmission from a base station 110 to a UE 102, or uplink transmission from a UE 102 to a base station 110, or both. Base stations 110 may perform radio configuration and scheduling for communication with UEs 102, or may operate under the control of a base station controller (not shown). In some examples, base stations 110 may be macro cells, small cells, hot spots, or the like.

Base stations 110 may communicate with one or more core network entities to provide network communication services for UEs 102. For example, a base station 110 may connect to a network entity 112, which may serve as user plane data gateway to the core network and/or provide control plane functions including mobility management. The network entity 112 may be further connected to another network entity 116, which may serve as user plane data gateway to a packet data network, such as the Internet 108. The core network entities 112 and 116 may route data packets originated from or destined to a UE 102 between the Internet 108 and a base station 110 serving the UE 102.

The Internet 108 may include an IP Multimedia Subsystem, a network/service architecture originally developed by the Third Generation Partnership Project (3GPP) to deliver voice or other multimedia services (e.g., Voice over IP (VoIP)) over IP packet-switched networks. The IMS services may enable voice, video, or other multimedia applications across various types of communication networks. An operator may deploy an IMS infrastructure in conjunction with a wireless access network. For example, IMS voice services may be provided via Voice over LTE (VoLTE) or Voice over Wi-Fi (VoWiFi).

A user of communication services may access one or more subscribers on a single wireless communication device. For example, a wireless communication device may be provided with one or more Subscriber Identity Modules, each SIM enabling at least one subscription to a wireless communication network. A Multi-SIM-Multi-Standby (MSMS) communication device with multiple SIMs may be connected to two or more separate (or same) networks associated with the respective subscribers, with one subscriber or network being active at a given time. In one example, the MSMS communication device may be a Dual-SIM-Dual-Standby (DSDS) communication device, which may include two SIMs that may both be active on standby, but one is deactivated when the other one is in use. For example, as illustrated in FIG. 1, a UE 102 may be a DSDS device connecting to WWAN 104 on one subscriber and WWAN 106 on the other subscriber, whereas another UE 102 may be a single communication device connecting to WWAN 104. On the other hand, a Multi-SIM-Multi-Active (MSMA) communication device may support all of the two or more subscribers or networks being active at a given time.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be for the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM.

In addition to communicating via WWANs 104 and/or 106, UEs 102 may also communicate via WLAN 120, such as using the Wi-Fi communication protocol. The WLAN 120 may enable wireless communication devices to communicate with the Internet 108 using standard Internet protocols, e.g., for voice over IP communications. The WLAN 120 may include a wireless access point (AP) 122 (e.g., a Wi-Fi "hotspot") that is coupled to the Internet. The wireless access point 122 may support wireless communication links 124 (e.g., Wi-Fi signals) with UE 102 that within communication range and logged into the access point. The wireless access point 122 may relay packetized communication packets (e.g., IP packets) between the UE 102 and the Internet, e.g., via wired (or fiber optic) networks 126, which may include an Internet service provider or "ISP" (not shown). A user device (e.g., UE 102) served by a wireless access point may also be referred to as an access terminal (AT).

For illustrative purposes, the following examples and figures may be described with reference to UEs and base stations of FIG. 1; however, other types of UEs or base stations may be used in same or other examples without limiting the scope of the present disclosure.

Figure 2:
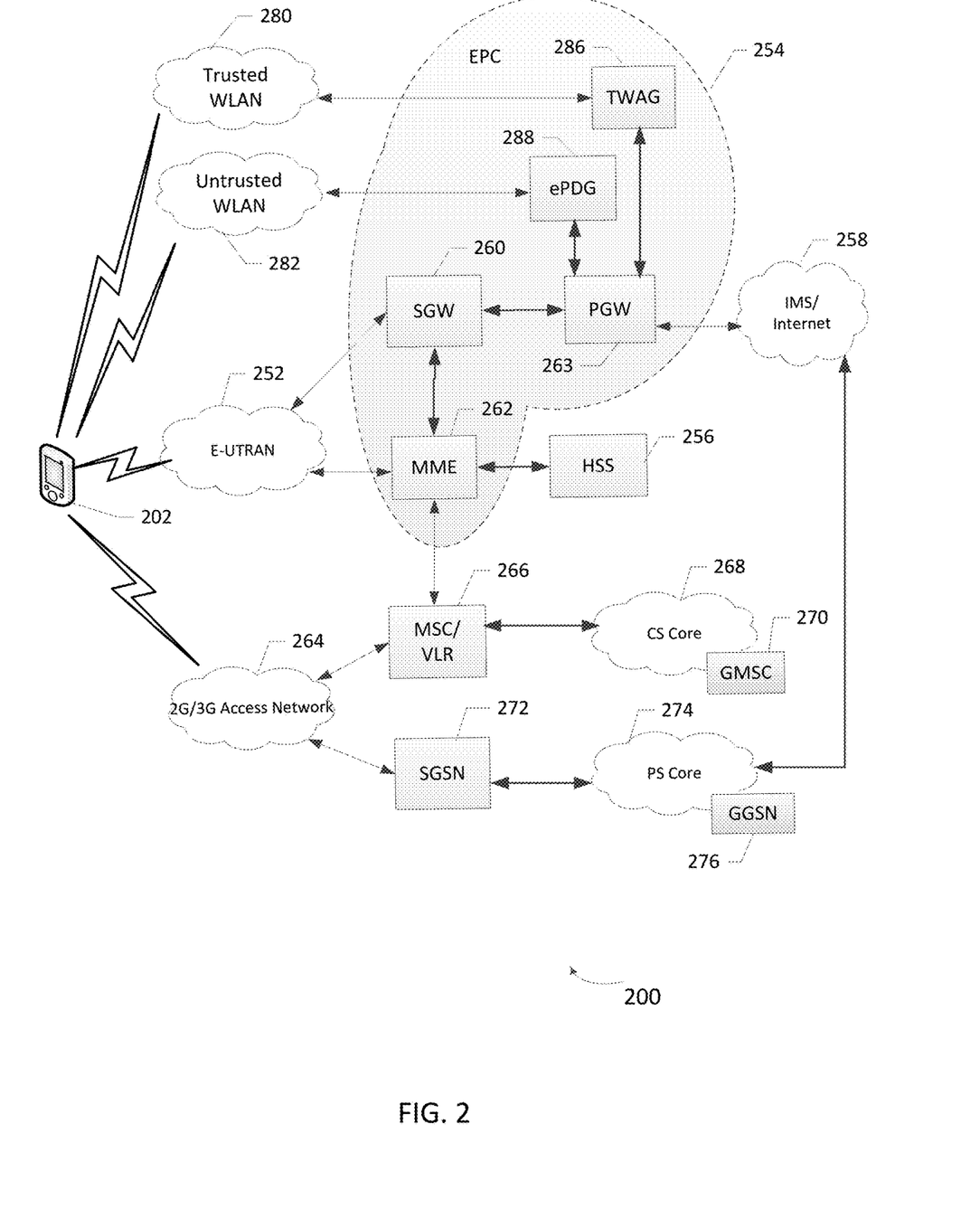
FIG. 2 illustrates an example of a network architecture that supports LTE inter-networking with other access technologies in accordance with various aspects of the present disclosure.

FIG. 2 illustrates an example of a network architecture 200 that supports LTE inter-networking with other access technologies in accordance with the present disclosure. A LTE network may include a radio access network, e.g., an Evolved Universal Mobile Telecommunications System (UMTS) Terrestrial Radio Access Network (E-UTRAN) 252, and a core network, e.g., an Evolved Packet Core (EPC) 254, to which the access network connects. Various aspects described with reference to LTE may be extended to other access technologies, e.g., a NR access technology.

In the network architecture 200, a UE 202 (e.g., a UE 102 in FIG. 1) may be connected to the E-UTRAN 252. The E-UTRAN 252 may comprise a network of LTE base stations or evolved Node Bs (eNodeBs), which may be connected to one another on an X2 interface (e.g., via backhaul) (not shown). In various aspects, each eNodeB may provide an access point to the LTE core network, e.g., the EPC 254, for network packet communication services.

The EPC 254 may include various core network entities, such as a Mobility Management Entity (MME) 262, a Serving Gateway (SGW) 260, and a Packet Data Network (PDN) Gateway (PGW) 263. The eNodeBs in the E-UTRAN 252 may connect to the EPC 254 by connecting to the SGW 260 and to the MME 262 within the EPC 254. The MME 262 may also be logically connected to SGW 260. In some aspects, one or more of the core network entities may be co-located within a single server or gateway. The MME 262 may provide various control functions, such as handling registration, paging, and security for E-UTRAN access on the EPC 254. The MME 262 may be linked to a Home Subscriber Server (HSS) 256, which may support a database containing user subscription, profile, and authentication information. Further, the MME 262 may provide bearer and connection management for user IP packets, which are transferred through the SGW 260. The SGW 260 may be connected to the PGW 263, which may provide IP address allocation to UE 202, as well as other functions. The PGW 263 may connect to packet data networks, through which IP services provided by the network operator may be accessed. For example, the PGW 263 may be connected to at least an IP Multimedia Subsystem and the Internet (IMS/Internet 258) in various aspects. Other example packet data networks may include enterprise VPNs, content delivery networks, etc.

The network architecture 200 may also include trusted and/or untrusted Wireless Local Area Networks (e.g., Wi-Fi networks). The UE 202 may connect to a trusted WLAN 280 and/or an untrusted WLAN 282 by connecting to corresponding wireless access points. In particular, the EPC 254 may include a Trusted Wireless Access Gateway (TWAG) 286 to which the trusted WLAN 280 may connect, and an Evolved Packet Data Gateway (ePDG) 288 to which the untrusted WLAN 282 may connect. The TWAG 286 and the ePDG 288 may each perform a variety of functions to enable access to the EPC through WLANs. Such functions may include, for example, providing secure tunneling and aggregation of traffic from a wireless access point, authenticating the wireless communication device, providing a secure tunneling mechanism to the PGW 263 (e.g., using General Packet Radio Service (GPRS) Tunneling Protocol (GTP) or Proxy Mobile IPv6 (PMIP)), creating a session request for bearer establishment, and performing voice-over WLAN call data forwarding between the PGW and the trusted WLAN 280 or untrusted WLAN 282. Thus, UE 202 may access the IP services provided by the network operator through the WLAN 280 and/or the untrusted WLAN 282. In various aspects, such IP services may include, but are not limited to, voice and video calling, and may be provided through various packet data networks (e.g., IMS/Internet 258).

The network architecture 250 may also include circuit-switched (CS) and packet-switched (PS) networks. In some aspects, UE 202 may be connected to the CS and/or PS packet switched networks by connecting to a legacy second generation (2G) or third generation (3G) access network 264, which may be one or more Global System for Mobile Communications (GSM), Enhanced Data rates for Global Evolution (EDGE) Radio Access Network (GERAN), UMTS Terrestrial Radio Access Network (UTRAN) etc. The 2G/3G access network 264 may include a network of base stations (e.g., base transceiver stations (BTSs), nodeBs, radio base stations (RBSs), etc.), as well as at least one base station controller (BSC) or radio network controller (RNC). The 2G/3G access network 264 may connect to the circuit switched network via an interface with (or gateway to) a Mobile switching center (MSC) and associated Visitor location register (VLR), which may be implemented together as MSC/VLR 266. In the CS network, the MSC/VLR 266 may connect to a CS core 268, which may be connected to external networks (e.g., the public switched telephone network (PSTN)) through a Gateway MSC (GMSC) 270. The 2G/3G access network 264 may connect to the PS network via an interface with (or gateway to) a Serving GPRS support node (SGSN) 272, which may connect to a PS core 274. In the PS network, the PS core 274 may be connected to external PS networks, such as the Internet and the Operator's IP services through a Gateway GPRS support node (GGSN) 276.

Figure 3:
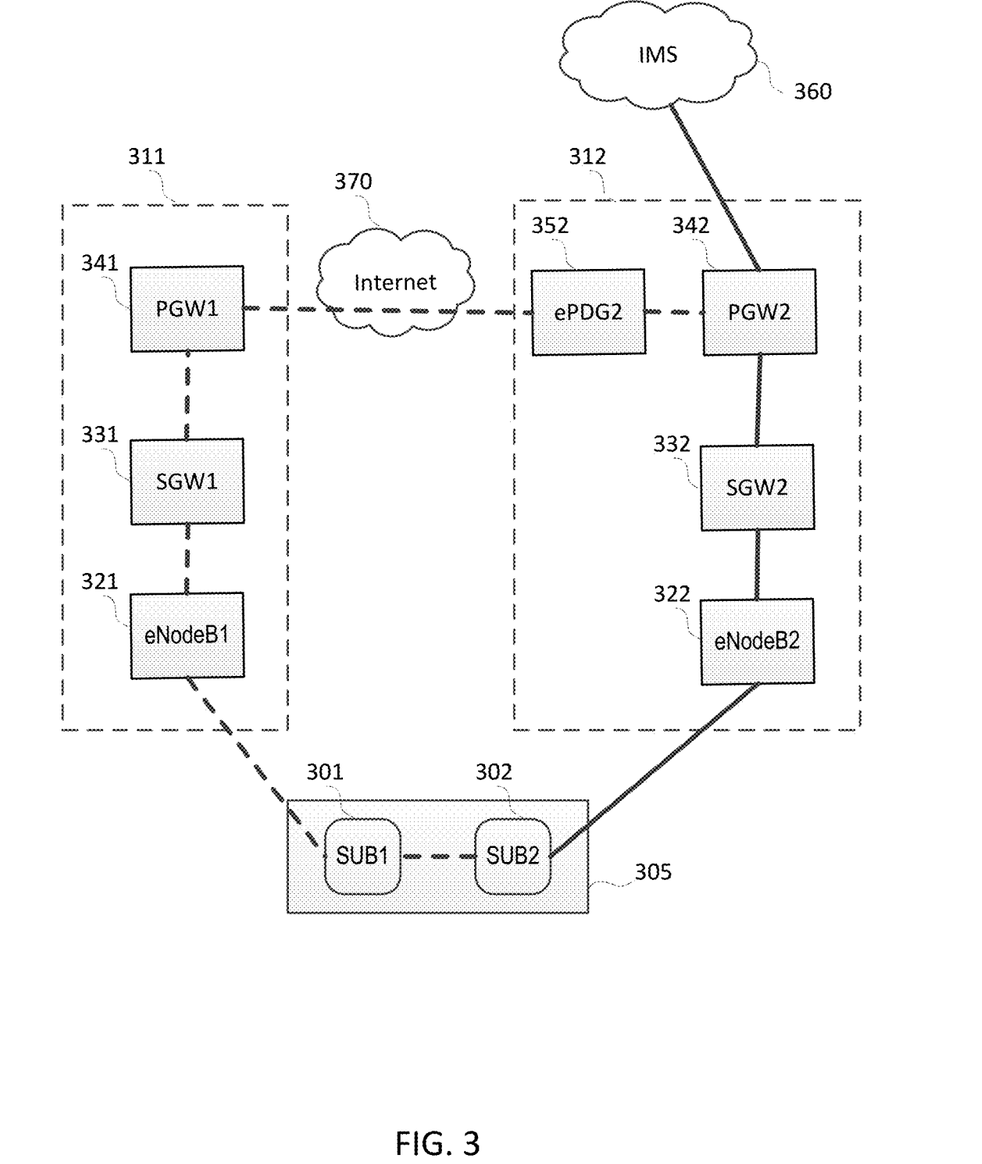
FIG. 3 illustrates an example of using one subscriber to conduct IMS service on another subscriber in accordance with the present disclosure.

FIG. 3 illustrates an example of using one subscriber to conduct IMS service on another subscriber in accordance with the present disclosure. A UE 305 (which may be an example of UE 102 in FIG. 1) may support two subscribers, e.g., a SUB1 301 and a SUB2 302. In some cases, each subscriber may be associated with a separate SIM, and UE 305 may support dual SIM dual standby.

Each subscriber may be associated with a different cellular network, e.g., SUB1 301 with a network 311 and SUB2 302 with a network 312. A subscriber may access its associated network for radio access and communication services, but may not directly access an unassociated network. The networks 311 and 312 may be deployed or controlled by same or different operators. As an illustrated example, each network is shown as a LTE network, including various E-UTRAN and EPC entities generally described with reference to FIGS. 1 and 2. However, principles and techniques described herein can be extended to other cellular networks, such as NR networks.

The UE 305 may conduct IMS services on SUB2 302 directly through the network 312 by following LTE network access procedures. For example, the UE 305 may establish a connection with eNodeB2 322 (part of E-UTRAN) and register SUB2 302 with EPC of the network 312. As illustrated in the figure, a packet data connection may be established within the network 312 (e.g., on an Evolved Packet System (EPS) bearer), linking the UE 305 with the eNodeB 322, a serving gateway (SGW2 332), and a PDN gateway (PGW2 342), leading to an IMS infrastructure (IMS 360). The PGW 342 may allocate IP address for the UE 305 and transport IP packets between the UE 305 and the IMS 360 with respect to SUB2 302's IMS sessions. For example, SUB2 302 may initiate or receive an IMS VoLTE call via the packet data connection through the network 312 leading to the IMS 360.

The UE 305 may also conduct IMS services on SUB2 302 indirectly through the network 311 associated with SUB1 301. Although SUB2 302 may not directly register with the network 311, an IMS application running on SUB2 302 may invoke internet connectivity provided by SUB1 301. In other words, SUB1 301 may act as an "internal hotspot" for SUB2 302. As illustrated in the figure, the network 311 may setup a packet data connection (e.g., on an EPS bearer) linking UE 305 on SUB1 301 with eNodeB1 321, a serving gateway (SGW1 331), and a PDN gateway (PGW1 341) of the network 311, to a gateway (e.g., ePDG2 352) of the network 312. In some cases, a default EPS bearer may be established to provide SUB1 301 with an "always-on" connectivity to a packet data network (e.g., the Internet 370).

An IMS application on SUB2 302 may use the internet connectivity provided by SUB1 301 to exchange IMS data and signaling with a gateway (e.g., ePDG2 352) in the SUB2's network 312, which is in turn connected to the PGW2 342 reaching the IMS 360. The ePDG2 352 (e.g., an Evolved Packet Data Gateway described with reference to FIG. 2) may serve as the entry point for an external network (e.g., the network 311) to access the core (e.g., PGW2 342 in the EPC) of the network 312. The PGW1 341 may communicate with the ePDG2 352 over direct links or generally via the Internet 370 (which may involve one or more intermediary nodes).

An IP address of ePDG2 352 may be known to SUB2 302 and/or PGW1 341 in various ways. For example, the IP address may be preconfigured for SUB2 302 (e.g., stored in SUB2 302's SIM card), or be discovered through a domain-name lookup service, such as dynamic Domain Name System (DDNS). In some implementations, an IMS application on SUB2 302 may request SUB1 301 to open an IP socket addressed to the ePDG2 352.

SUB2 302 may apply a tunneling protocol over its communications with ePDG2 352 via SUB1 301's network 311. For example, IMS packets between SUB2 302 and the ePDG2 352 can be encapsulated and encrypted by, e.g., IP Security Protocol (IPSec), while being transported across the network 311. Thus, a secure IP tunnel may be created to facilitate subscriber authentication and registration with the ePDG2 352 and the IMS 360. For example, SUB2 302 may authenticate with the ePDG2 352 using a credential associated with SUB2 302, even though data packets pass through the network 311 (e.g., via PGW1 341) associated with SUB1 301. In some cases, from an air interface point of view, since the UE 305 may communicate with SUB1 301's network 311 (e.g., with eNodeB1 321) in a licensed spectrum, the internal tunneling via SUB1 301 may avoid the usage of a Wi-Fi unlicensed spectrum, especially if a nearby Wi-Fi network is congested.

SUB2 302 may switch between conducting an IMS service directly through the network 312 or doing so indirectly through the network 311. The switching may be controlled or initiated by UE 305, the network 312, and/or the IMS 360. For example, SUB2 302 may de-register with ePDG2 or handover the internet connection provided by SUB1 301, and then access the network 312 for an IMS service. In another example, the network 312 and/or the IMS 360 may move or instruct SUB2 302 to access the IMS 360 either via the ePDG2 352 (corresponding to internal sharing on SUB1 301's internet resource) or via eNobdeB2 322 leading to PGW2 342 in the network 312.

As SUB2 302 may appear as an ordinary internet user to SUB1 301, the sharing of internet resources for IMS services may be achieved in a way transparent to the network 311, and hence may provide seamless continuity in IMS services on SUB2 302 across networks that may belong to different operators. In addition, because continuous availability of IMS services may be supported without infrastructure upgrade or modification on the shared network (e.g., the network 311 with respect to SUB2 302), the techniques described herein may offer numerous commercial advantages in terms of cost, scale, or speed of deployment.

Figure 4:
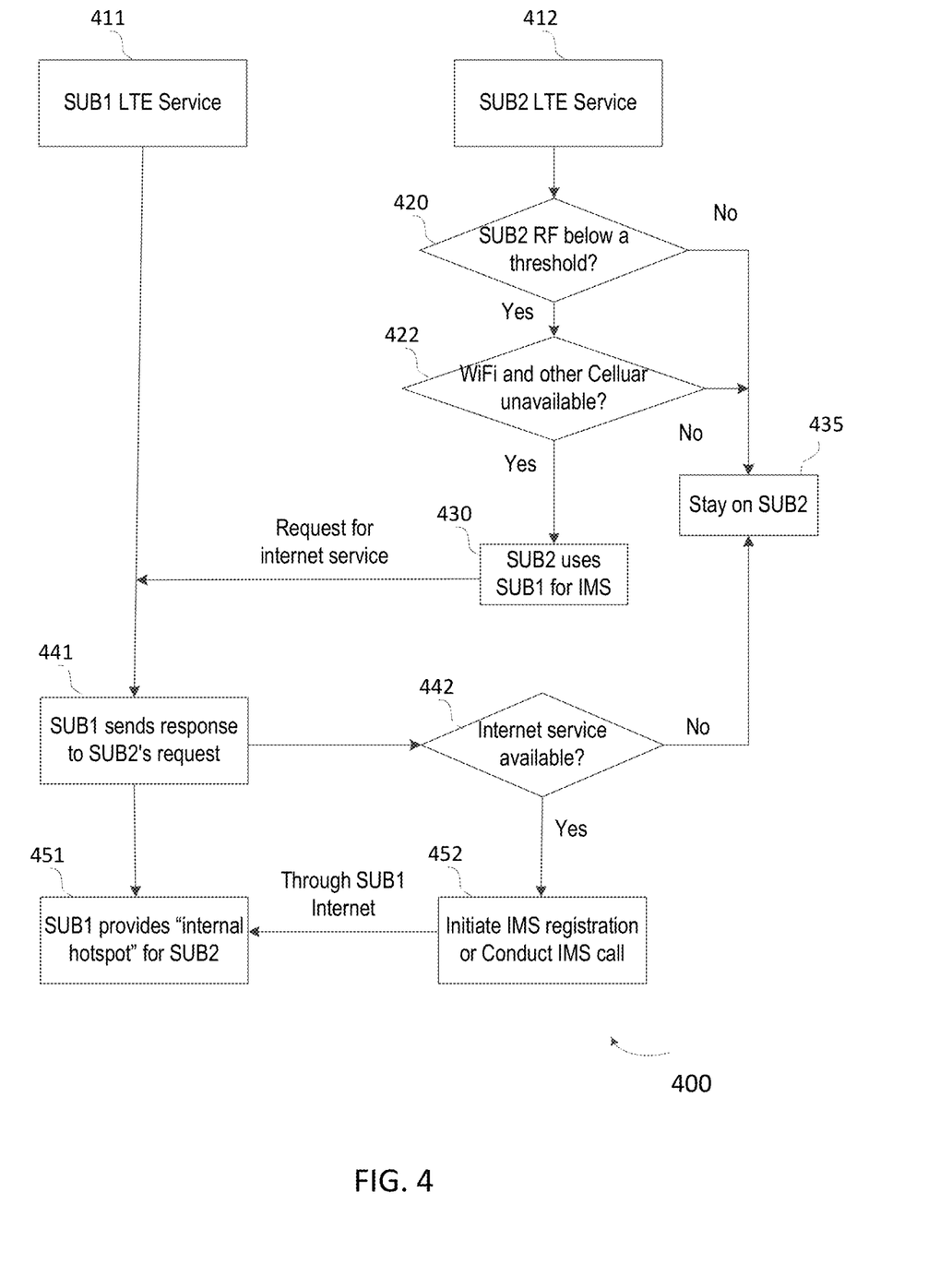
FIG. 4 illustrates an example of a control flow for internet resource sharing between multiple subscribers in accordance with the present disclosure.

FIG. 4 illustrates an example of a control flow 400 for internet resource sharing between multiple subscribers in accordance with the present disclosure. Two subscribers (SUB1 and SUB2) on a UE may have LTE services respective LTE networks, e.g., at block 411 for SUB1 and block 412 for SUB2. One subscriber may be in active communications while the other in standby; or both subscribers may be in active communications.

Consider a scenario when SUB2 may lose its LTE coverage, e.g., due to degraded radio frequency (RF) conditions. Consequently, IMS services carried via SUB2's LTE network may experience interruption or outage. However, an end-user may still desire continuity in SUB2's IMS services despite loss of the underlying LTE coverage. For example, a caller of the end-user may only know a phone number associated with SUB2, or the end-user may prefer to use the SUB2's phone number when calling even though he or she may call through SUB1's phone number.

At block 420, the UE may determine whether SUB2's RF condition is below a threshold. If so, SUB2 may be under inadequate or failing LTE coverage for purposes of IMS services, and at block 422, the UE may further check whether neither Wi-Fi nor other cellular on SUB2 available. If this is the case, the UE may decide to use SUB1's internet resource for IMS on SUB2 at block 430. Otherwise, the UE may stay on SUB2 at block 435 and may handover IMS services to Wi-Fi or other cellular service on SUB2.

If SUB1 is to be used, SUB2 (or its IMS applications) may send a request for internet (e.g., IP) service from SUB1. The request may be an open-socket request for an IP connection to a gateway of SUB2's core network (e.g., an ePDG), e.g., as described with reference to FIG. 3. At block 441, SUB1 may send a response to SUB2's request, and at block 442, SUB2 may check whether the requested internet service is available. If the internet service is not available, the UE may remain on SUB2; otherwise at block 452, SUB2 may conduct various IMS services through SUB1's internet connection, such as initiating IMS registration or conduct IMS call or other IMS operations. At block 451, SUB1 may provide "internal hotspot" for SUB2 in a manner, e.g., as described with reference to FIG. 3. For example, SUB1 may provide a packet data connection transporting SUB2's IMS data and signaling to and from SUB2's core network through SUB1's network.

Figure 5:
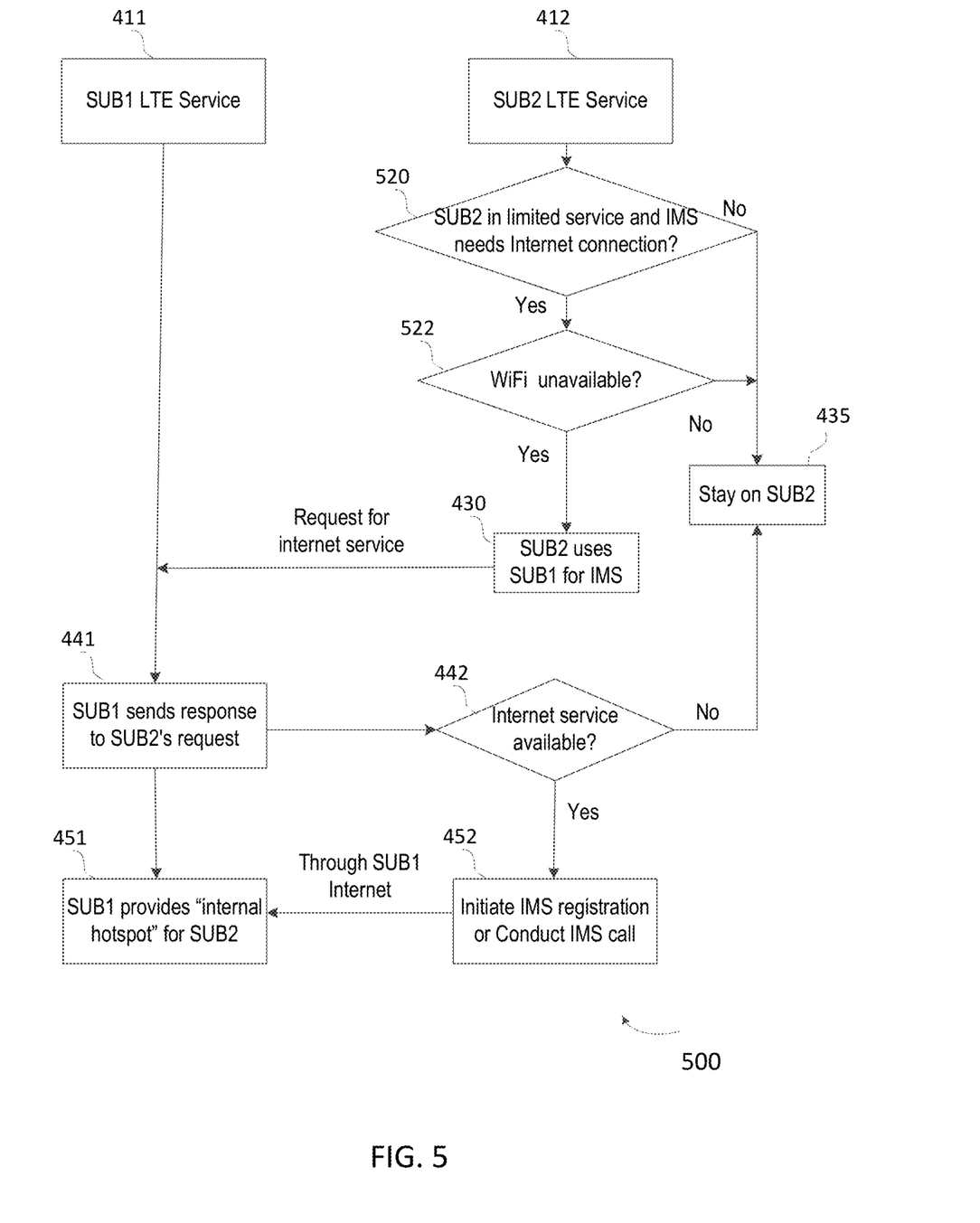
FIG. 5 illustrates an example of a control flow for internet resource sharing between multiple subscribers in accordance with the present disclosure.

FIG. 5 illustrates an example of a control flow 500 for internet resource sharing between multiple subscribers in accordance with the present disclosure. The control flow 500 is largely similar to the control flow 400 in FIG. 4, except for blocks 520 and 522. In other words, the control flow 500 may be viewed as the control flow 400 being adapted to a scenario where SUB2 is in limited service due to roaming. For purposes of avoiding lengthy repetition, blocks 520 and 522 are described in details in view of the roaming scenario, whereas other blocks are referred with reference to FIG. 4.

SUB2 may be in roaming and under a coverage of a visited LTE network that may lack a roaming arrangement with SUB2's home network or operator. In some cases, SUB2 may be in a limited service and, for example, may not connect to the visited network except for an emergency call.

At block 520, SUB2 may check whether it is in a limited service and whether an IMS service would need internet connection. If so, it may further check whether a Wi-Fi is available at block 522, otherwise it may stay on SUB2 at block 435 and may handover to Wi-Fi for IMS services. However, if no Wi-Fi is available, SUB2 may decide to use SUB1 for IMS services at block 430, and may subsequently conduct IMS services over SUB1's internal hotspot as generally described in FIG. 4.

Figure 6:
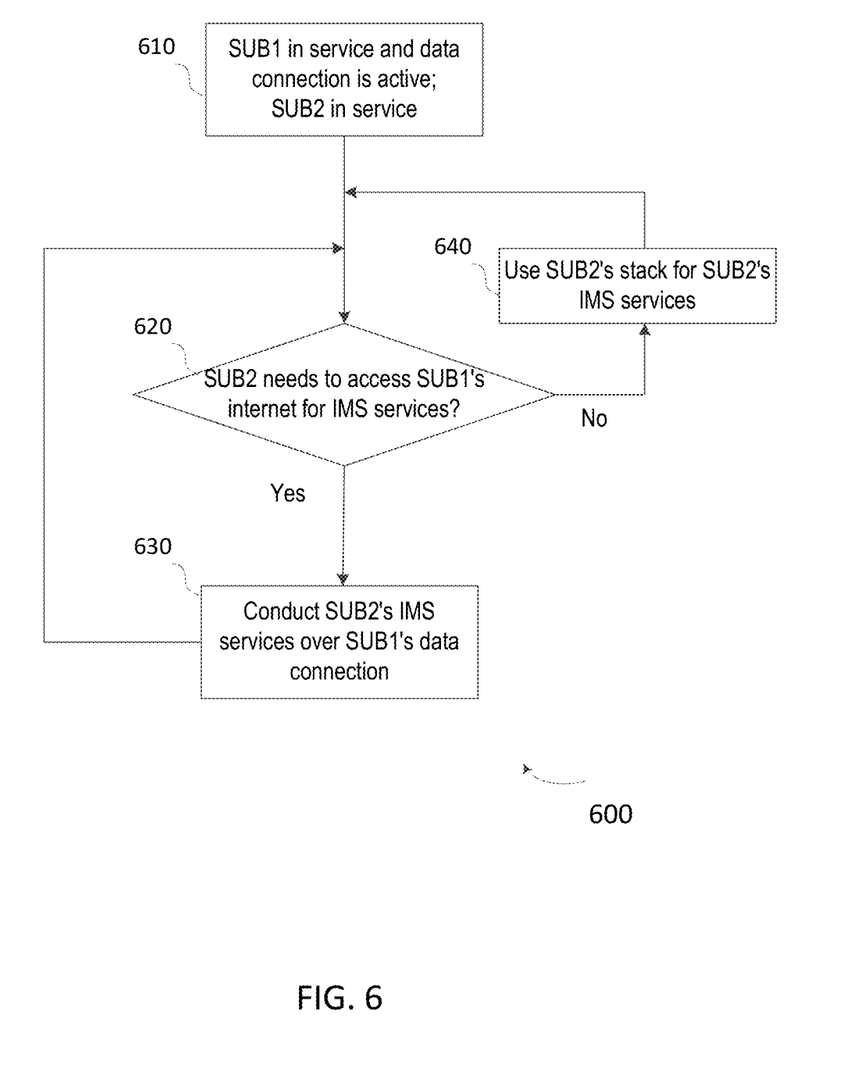
FIG. 6 illustrates an example of a control flow for internet resource sharing between multiple subscribers in accordance with the present disclosure.

FIG. 6 illustrates an example of a control flow 600 for internet resource sharing between multiple subscribers in accordance with the present disclosure. The control flow 600 may generalize various aspects of the control flows 400 and 500 described with reference to FIGS. 4 and 5.

At block 610, two subscribers (e.g., SUB1 and SUB2) are in service. Furthermore, SUB1 has an active data connection which may provide internet (or IP) connectivity.

At block 620, SUB2 may determine whether it needs to access SUB1's internet for SUB2's IMS services. If so, at block 630, SUB2 may conduct the IMS services over SUB1's data connection, e.g., as described with reference to FIGS. 3, 4 and 5. Otherwise at block 640, SUB2 may conduct the IMS services within its own (protocol) stacks without invoking SUB1's internet connectivity. SUB2's protocol stacks may include various software, firmware, or hardware procedures in obtaining a cellular service on SUB2.

Furthermore, as illustrated in the figure, the control flow 600 may iterate and revisit block 620. For example, even if SUB1 was used to conduct SUB2's IMS service (e.g., at block 630), the block 620 may be checked again to determine whether SUB1's internet would still be needed. If not, UE may return to block 640 and use SUB2 for the IMS services.

An implementation may consider a variety of factors in determining whether to use SUB1's internet (or share internet resources). Many of these factors are already described with reference to FIGS. 4 and 5 (e.g., blocks 420, 422, 520, 522). For example, there might not be a WLAN (e.g., Wi-Fi) access available, which renders WLAN-based IMS mobility solution unavailable. In some cases, SUB2's cellular service may experience degradation or outage, or be limited due to lack of roaming arrangement.

The determination at block 620 on whether to use SUB1's internet may be made by a UE autonomously. For example, a UE may monitor SUB2's cellular coverage to switch between SUB1's internet and SUB2's stacks for IMS services: If the coverage falls below an adequate level, SUB2 may switch to SUB1's internet, or thereafter switch back to SUB2's stacks if the coverage returns to normal service. Moreover, since internet resource sharing may be made transparent to SUB1's network (e.g., as described with reference to FIG. 3), UE may autonomously switch among alternative paths over which the IMS services are carried.

The determination at block 620 on whether to use SUB1's internet may also be made by the network with or without UE's participation. For example, SUB2's cellular network may decide to offload SUB2, e.g., for reasons of load balancing or congestion avoidance. In some aspects, a subscriber may receive an indication from the network on whether to use another subscriber for IMS services.

Figure 7:
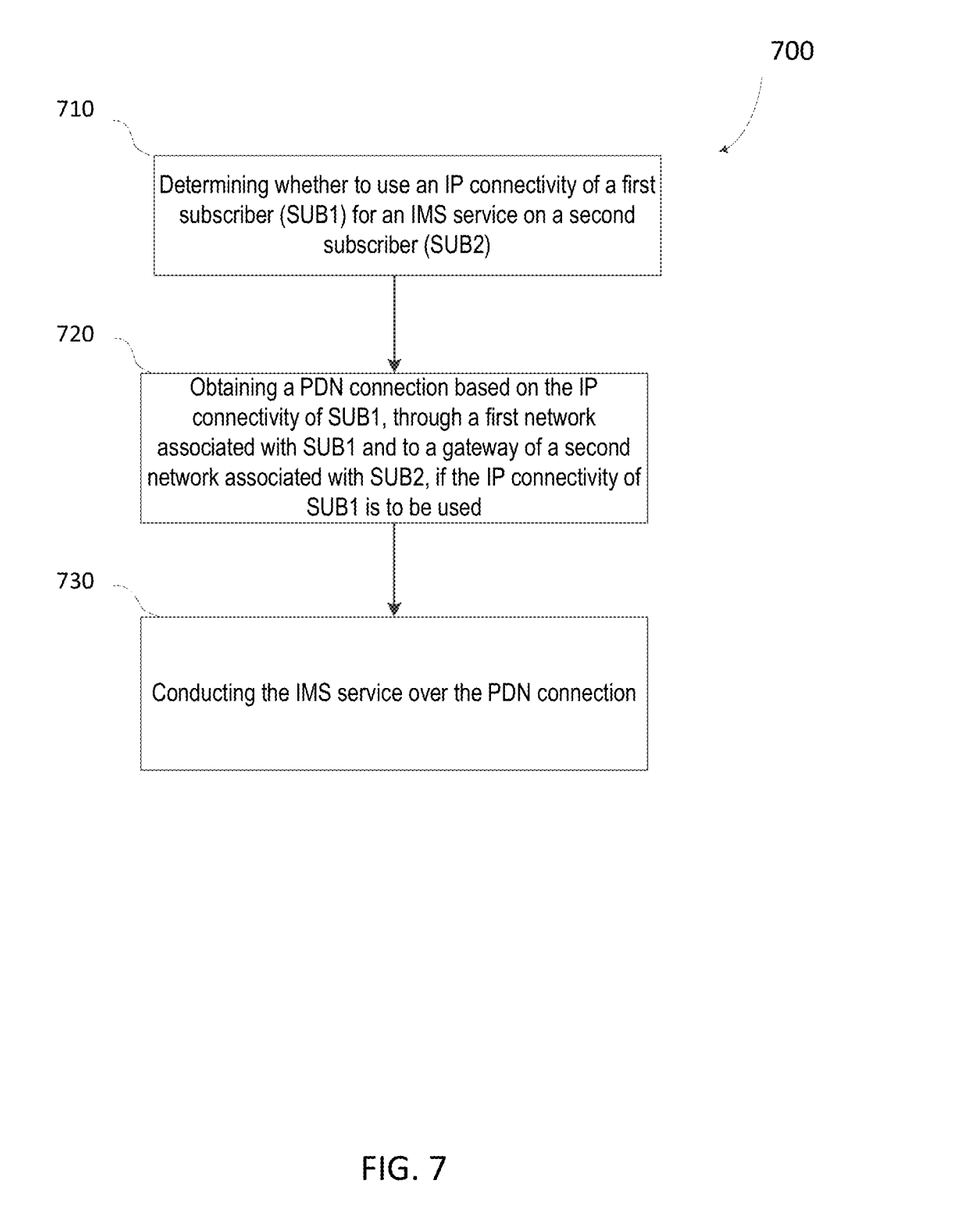
FIG. 7 illustrates an example of a method that supports internet resource sharing between multiple subscribers in accordance with the present disclosure.

FIG. 7 illustrates an example of a method 700 that supports internet resource sharing between multiple subscribers in accordance with the present disclosure. The method 700 may encompass various aspects of techniques as described with reference to FIGS. 3, 4, 5, and 6. The method 700 may be implemented by a UE or by one or more components thereof.

A UE may support multiple subscribers in a single user device, for example, a dual or multi-SIM UE having multiple SIM cards. One subscriber may be in active communications with an associated cellular network, while the other subscribers may be in standby. A subscriber in standby may camp on its associated cellular network in an idle mode but may be transitioned to active communications.

At step 710, the UE may determine whether to use an IP connectivity of a first subscriber (SUB1) for an IMS service on a second subscriber (SUB2). The IP connectivity may generally refer to any communication connectivity to an IP-based packet data network. SUB1 may offer the IP connectivity for a client or application. In some cases, SUB1 may be on a cellular service such as LTE that can provide internet connections.

The determination in step 710 may include various aspects of the block 620 as described with reference to FIG. 6. For example, the IP connectivity of SUB1 may be used only if SUB2 has no access to a wireless local area network (e.g., a Wi-Fi network). Other factors may also be considered (even if no Wi-Fi is available, for example). In a scenario, the IP connectivity of SUB1 may be used only if a radio frequency condition of a cellular service of SUB2 is below a threshold. The radio frequency condition may refer to, for example, a receive reference signal power, a path loss metric, a receive signal to noise (and interference) ratio (SNR), or other quality metric on a channel. An implementation may configure the threshold to a value corresponding to inadequate cellular service; for example, the threshold may be set based on an SNR requirement of the IMS service. In another scenario, the IP connectivity of SUB1 may be used only if SUB2 is in a limited service due to roaming that does not support the IMS service. For example, SUB2 may visit a cellular network lacking a roaming arrangement with SUB2's home network such that SUB2 may not access the base stations of the visited network except for an emergency (e.g., 911) call.

Although a UE may autonomously determine whether to use SUB1 or SUB2, in some cases, the UE may receive an instruction by a network or an end-user regarding which subscriber to use. For example, a network may send an indicator to the UE selecting a particular subscriber to use in carrying the IMS service.

At step 720, the UE may obtain a packet data network connection based on the IP connectivity of SUB1, if the IP connectivity of SUB1 (or in short, SUB1) is to be used. Some examples of such PDN connections are described with reference to FIG. 3. The PDN connection may pass through a first network associated with SUB1 to a gateway of a second network associated with SUB2. In particular, the PDN connection may comprise a PDN gateway of the first network (e.g., a PGW) in communication with the gateway of the second network. The gateway of the second network may be an ePDG that provides an entry point for an (external) untrusted network to access core network entities of the second network (e.g., a PGW connected to an IMS server). Other types of gateway may be used; for example, a TWAG may be used if operators of the first and the second network are the same or they coordinate with each other. Furthermore, UE may authenticate using SUB2's credential or identity with the gateway of the second network over the PDN connection.

A tunneling protocol may be applied on IP packets of the IMS service over the PDN connection. For example, when using SUB1's IP connectivity, an IMS application on SUB2 may encapsulate its IP packets using a secure tunneling protocol (such as IPsec) to provide a protected connection through the first network with an ePDG of the second network.

In some cases, to initiate the establishment of the PDN connection, SUB2 may send a request to SUB1 for the PDN connection. SUB1 may accept or reject the request. SUB2 may start to use the PDN connection (that is, using SUB1's cellular service) if receiving from SUB1 a positive acknowledgment of the request; otherwise, SUB2 may stay on its own cellular service for the IMS service.

At step 730, SUB2 may conduct the IMS service over the PDN connection. The IMS service may generally refer to any IMS related operations, such as, initiating IMS registration, performing an IMS call, etc. In some cases, an end-user may be able to make or receive IMS call on SUB2's identity even though SUB2's own cellular service may be limited or losing coverage. During SUB2's IMS operations, IMS data and/or signaling may pass through SUB1's network (the first network) and enter into the core of SUB2's network (the second network) leading to an IMS server, while skipping SUB2's radio access network (e.g., without communicating with a base station of the second network).

Additionally, SUB2 may return to its own cellular network for IMS service, for example, if a quality of SUB2's cellular service is above a threshold. UE may handover the PDN connection from SUB1 to SUB2 and may conduct the IMS service over a cellular service of SUB2 by the second network. The handover from SUB1 to SUB2 may provide IP continuity for the IMS service. Various techniques or implementations may be adopted, e.g., as described with reference to FIGS. 2 and 6, to switch between SUB1's internal hotspot and SUB2's own cellular service for SUB2's IMS services.

Figure 8:
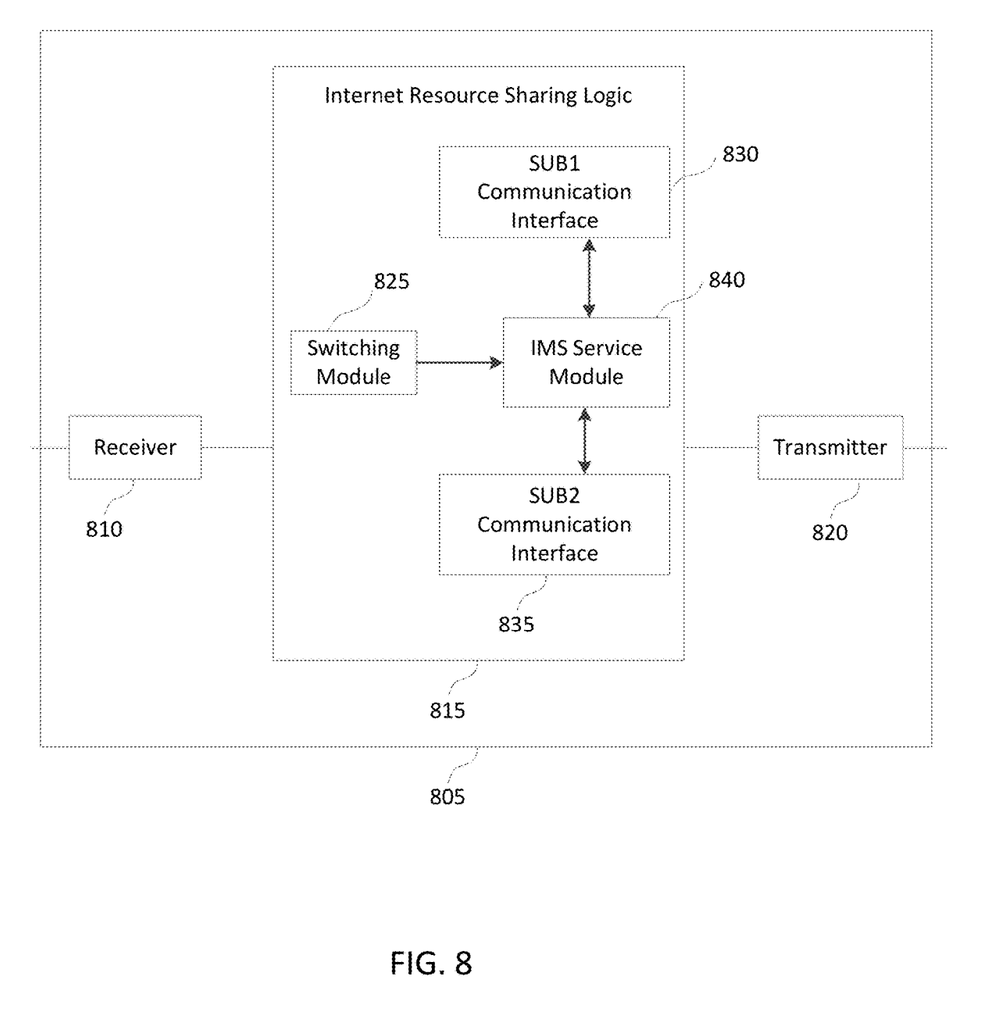
FIG. 8 illustrates an example of an apparatus that supports internet resource sharing between multiple subscribers in accordance with the present disclosure.

FIG. 8 illustrates an example of an apparatus 805 that supports internet resource sharing between multiple subscribers in accordance with the present disclosure. A first subscriber (SUB1) and a second subscriber (SUB2) may be supported by a single user device, e.g., a dual or multi-SIM device. The apparatus 805 may include a receiver 810, a transmitter 820, and an internet resource sharing logic 815, and may perform various aspects of the control flows 400, 500, 600 and the method 700 described with reference to FIGS. 4, 5, 6 and 7. The apparatus 805 may be embodied by, or resides within, a UE 102 with reference to FIG. 1.

The receiver 810 may receive information such as packets, user data, or control information associated with various information channels. Information may be passed on to other components of the apparatus. The receiver 810 may utilize a single antenna or a set of multiple antennas. The receiver 810 may be configured to receive signals or channels from cellular networks (e.g., base stations) of either or both of the two subscribers.

The transmitter 820 may transmit signals generated by other components of the apparatus. In some examples, the transmitter 820 may be collocated with a receiver 810 in a transceiver module. The transmitter 820 may utilize a single antenna or a set of multiple antennas. The transmitter 820 may be configured to transmit signals or channels from cellular networks (e.g., base stations) of either or both of the two subscribers.

The receiver 810 and transmitter 820 (or a transceiver incorporating both) may be coupled to the internet resource sharing logic 815 and may provide means for communications between the apparatus 805 with cellular networks of SUB1 and SUB2.

The internet resource sharing logic 815 may be a baseband modem or an application processor or may illustrate aspects of a baseband or application processor. The internet resource sharing logic 815 or at least some of its various sub-components may be implemented in hardware, software executed by a processor, firmware, or any combination thereof. If implemented in software executed by a processor, the functions of the internet resource sharing logic 815 or at least some of its various sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure. Software may comprise codes or instructions stored in a memory or like medium that is connected or in communication with the process described above. The codes or instructions may cause the processor, the apparatus 805, or one or more components thereof to perform various functions described herein.

The internet resource sharing logic 815 or at least some of its various sub-components may be physically located at various positions, including being distributed such that portions of functions are implemented at different physical locations by one or more physical devices. In some examples, the internet resource sharing logic 815 or at least some of its various sub-components may be a separate and distinct component. In other examples, the internet resource sharing logic 815 or at least some of its various sub-components may be combined with one or more other hardware components, including but not limited to an I/O component, a transceiver, a server, another computing device, one or more other components described in the present disclosure, or a combination thereof in accordance with various aspects of the present disclosure.

The internet resource sharing logic 815 may include a switching module 825, a SUB1 communication interface 830, a SUB2 communication interface 835, and an IMS service module 840. In some aspects, SUB1 communication interface 830 and SUB2 communication interface 835 may reside in a communications processor or modem, whereas the switching module 825 and the IMS service module 840 may reside in an application processor or module.

The SUB1 communication interface 830 and the SUB2 communication interface 835 may provide means for an application to access respectively SUB1's and SUB2's cellular network communications service. In general, either of these communication interfaces (830 or 835) may provide data connection for its own IMS services through its associated network. In addition, the SUB1 communication interface 830 (and/or SUB2 communication interface 835) may provide an internet or IP connectivity to an end-user or its application (as an "internal hotspot"). Furthermore, these interfaces (830 and 835) may also provide various measurements on quality of the respective cellular service or network.

Furthermore, SUB1 communication interface 830 may also provide means for obtaining a PDN connection, based on SUB1's internet connectivity, through a first network associated with SUB1 to a gateway (e.g., an ePDG) of a second network associated with SUB2 (if SUB1 is to be used for SUB2's IMS service). SUB1 communication interface 830 may support various techniques described with reference to FIG. 3. For example, the PDN connection may include a PDN gateway (e.g., a PDW) of the first network in communication with the gateway of the second network. Through the SUB1 communication interface 830, a tunneling protocol may be applied on SUB2's IP packets of the IMS service over the PDN connection. For example, SUB2 and ePDG of SUB2's core network may use IPsec to communicate securely over the IP stacks of SUB1. In some cases, the apparatus 805 may bypass radio access protocol stacks associated with SUB2 communication interface 835, when SUB1 communication interface 830 serves as an internal hotspot for SUB2's IMS services.

The switching module 825 may provide means for determining whether to use an IP connectivity of SUB1 for an IMS service on SUB2. The switching module 825 may be configured to execute the step 710 described with reference to FIG. 7. A variety of factors may be taken into account by the switching module 825. For example, SUB1 may be used if there is no access to a WLAN, otherwise IMS service may be offloaded to a Wi-Fi. Furthermore, SUB1 may be used only if a radio frequency condition of SUB2's cellular service is below a threshold, or only if SUB2 is in a limited service due to roaming that does not support the IMS service.

The switching module 825 may be configured to switch between SUB1's internal hotspot (e.g., via SUB1 communication interface 830) or SUB2's own cellular service (e.g., via SUB2 communication interface 835), e.g., as generally described with reference to FIG. 6. For example, if SUB2 regains its cellular service after losing radio coverage, the switching module 825 may change the path, over which SUB2's IMS service is carried, from SUB1's internet resource to SUB2's cellular network. A previous PDN connection through SUB1 may be handed-over to SUB2 and the IMS service may be carried over SUB2's cellular service (e.g., via SUB2 communication interface 835 instead of SUB1 communication interface 830).

Although the switching module 825 may autonomously determine whether to use SUB1 or SUB2, in some cases, the switching module 825 may receive an instruction by a network or an end-user regarding which subscriber to use. For example, a network may send an indicator to the apparatus 805 selecting a particular subscriber in carrying the IMS service.

The IMS service module 840 may provide means for conducting IMS services using either SUB1 or SUB2's communication interface (830 or 835). For example, the IMS service module 840 may include multiple IMS service modules per subscriber. The switching module 825 may determine which communication interface to use. In order to obtain a PDN connection through SUB1, the IMS service module 840 (or the switching module 825) may send a request to SUB1 communication interface 830 for the PDN connection and receive a (positive or negative) acknowledgement of the request. The IMS service module 840 may conduct various IMS services, such as IMS registration, IMS call, or other data or signaling sessions.

In one or more disclosed examples, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a user equipment (UE), comprising:
   determining whether to use an Internet Protocol (IP) connectivity of a first subscriber for an IP Multimedia Subsystem (IMS) service on a second subscriber;
   obtaining a packet data network (PDN) connection based on the IP connectivity of the first subscriber, through a first network associated with the first subscriber and to a gateway of a second network associated with the second subscriber, if the IP connectivity of the first subscriber is determined to be used; and conducting the IMS service on the second subscriber over the PDN connection; and
wherein said obtaining the PDN connection comprises:
sending a request to the first subscriber for the PDN connection; and
receiving from the first subscriber an acknowledgement of the request.

2. The method of claim 1, wherein the IP connectivity of the first subscriber is to be used only if the second subscriber has no access to a wireless local area network.

3. The method of claim 2, wherein the IP connectivity of the first subscriber is to be used only if a radio frequency condition of a cellular service of the second subscriber is below a threshold.

4. The method of claim 2, wherein the IP connectivity of the first subscriber is to be used only if the second subscriber is in a limited service due to roaming that does not support the IMS service.

5. The method of claim 1, wherein the PDN connection comprises a PDN gateway of the first network in communications with the gateway of the second network.

6. The method of claim 1, further comprising:
applying a tunneling protocol on IP packets of the IMS service over the PDN connection.

7. The method of claim 6, wherein the gateway of the second network is an evolved packet data gateway (ePDG).

8. The method of claim 1, wherein conducting the IMS service comprises:
performing an IMS call on the second subscriber over the PDN connection.

9. The method of claim 1, further comprising:
handing-over the PDN connection from the first subscriber to the second subscriber; and
conducting the IMS service over a cellular service of the second subscriber by the second network.

10. A user equipment (UE) of wireless communication, comprising:
a transceiver; and
a processor coupled to the transceiver, the processor configured to:
determine whether to use an Internet Protocol (IP) connectivity of a first subscriber for an IP Multimedia Subsystem (IMS) service on a second subscriber;
obtain a packet data network (PDN) connection based on the IP connectivity of the first subscriber, through a first network associated with the first subscriber and to a gateway of a second network associated with the second subscriber, if the IP connectivity of the first subscriber is determined to be used; and
conduct the IMS service on the second subscriber over the PDN connection via the transceiver; and
wherein the processor configured to obtain the PDN connection comprises the processor configured to:
send a request to the first subscriber for the PDN connection; and
receive from the first subscriber an acknowledgement of the request.

11. The UE of claim 10, wherein the IP connectivity of the first subscriber is to be used only if the second subscriber has no access to a wireless local area network.

12. The UE of claim 11, wherein the IP connectivity of the first subscriber is to be used only if a radio frequency condition of a cellular service of the second subscriber is below a threshold.

13. The UE of claim 11, wherein the IP connectivity of the first subscriber is to be used only if the second subscriber is in a limited service due to roaming that does not support the IMS service.

14. The UE of claim 10, wherein the PDN connection comprises a PDN gateway of the first network in communications with the gateway of the second network.

15. The UE of claim 10, wherein the processor is further configured to:
apply a tunneling protocol on IP packets of the IMS service over the PDN connection.

16. The UE of claim 15, wherein the gateway of the second network is an evolved packet data gateway (ePDG).

17. The UE of claim 10, wherein the processor configured to conduct the IMS service comprises the processor configured to:
perform an IMS call on the second subscriber over the PDN connection.

18. The UE of claim 10, wherein the processor is further configured to:
handover the PDN connection from the first subscriber to the second subscriber; and
conduct the IMS service over a cellular service of the second subscriber by the second network.

19. An apparatus of wireless communication at a user equipment (UE), comprising:
means for determining whether to use an Internet Protocol (IP) connectivity of a first subscriber for an IP Multimedia Subsystem (IMS) service on a second subscriber;
means for obtaining a packet data network (PDN) connection based on the IP connectivity of the first subscriber, through a first network associated with the first subscriber and to a gateway of a second network associated with the second subscriber, if the IP connectivity of the first subscriber is determined to be used; and
means for conducting the IMS service on the second subscriber over the PDN connection; and
wherein the means for obtaining the PDN connection comprises:
means for sending a request to the first subscriber for the PDN connection; and
means for receiving from the first subscriber an acknowledgement of the request.

20. The apparatus of claim 19, wherein the IP connectivity of the first subscriber is to be used only if the second subscriber has no access to a wireless local area network.

21. The apparatus of claim 19, wherein the PDN connection comprises a PDN gateway of the first network in communications with the gateway of the second network.

22. The apparatus of claim 19, further comprising:
means for applying a tunneling protocol on IP packets of the IMS service over the PDN connection.

23. The apparatus of claim 22, wherein the gateway of the second network is an evolved packet data gateway (ePDG).

24. The apparatus of claim 19, further comprising:
means for handing-over the PDN connection from the first subscriber to the second subscriber; and
means for conducting the IMS service over a cellular service of the second subscriber by the second network.

25. A non-transitory computer-readable medium having instructions stored thereon, the instructions comprising codes executable for a user equipment (UE) to perform:
determining whether to use an Internet Protocol (IP) connectivity of a first subscriber for an IP Multimedia Subsystem (IMS) service on a second subscriber;

obtaining a packet data network (PDN) connection based on the IP connectivity of the first subscriber, through a first network associated with the first subscriber and to a gateway of a second network associated with the second subscriber, if the IP connectivity of the first subscriber is determined to be used; and conducting the IMS service on the second subscriber over the PDN connection; and wherein the codes for obtaining the PDN connection comprises:

codes for sending a request to the first subscriber for the PDN connection; and codes for receiving from the first subscriber an acknowledgement of the request.

26. The medium of claim 25, wherein the IP connectivity of the first subscriber is to be used only if the second subscriber has no access to a wireless local area network.

27. The medium of claim 25, wherein the PDN connection comprises a PDN gateway of the first network in communications with the gateway of the second network.

28. The medium of claim 25, further comprising:

codes for handing-over the PDN connection from the first subscriber to the second subscriber; and codes for conducting the IMS service over a cellular service of the second subscriber by the second network.

* * * * *